US011128656B2

(12) United States Patent
Xie et al.

(10) Patent No.: US 11,128,656 B2
(45) Date of Patent: *Sep. 21, 2021

(54) SELECTIVE SINKHOLING OF MALWARE DOMAINS BY A SECURITY DEVICE VIA DNS POISONING

(71) Applicant: Palo Alto Networks, Inc., Santa Clara, CA (US)

(72) Inventors: Huagang Xie, Pleasanton, CA (US); Taylor Ettema, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 16/283,545

(22) Filed: Feb. 22, 2019

(65) Prior Publication Data
US 2019/0190948 A1 Jun. 20, 2019

Related U.S. Application Data

(63) Continuation of application No. 15/075,003, filed on Mar. 18, 2016, now Pat. No. 10,257,221, which is a
(Continued)

(51) Int. Cl.
*G06F 11/00* (2006.01)
*G06F 12/14* (2006.01)
(Continued)

(52) U.S. Cl.
CPC ...... *H04L 63/1441* (2013.01); *H04L 61/1511* (2013.01); *H04L 63/02* (2013.01);
(Continued)

(58) Field of Classification Search
CPC ............ H04L 63/1441; H04L 61/1511; H04L 63/1425; H04L 63/02; H04L 63/20;
(Continued)

(56) References Cited

U.S. PATENT DOCUMENTS 7,467,410 B2   12/2008   Graham
7,934,254 B2    4/2011   Graham
(Continued)

FOREIGN PATENT DOCUMENTS

WO   2007050244 A2   5/2007

OTHER PUBLICATIONS

Christian Rossow, Thesis, Using Malware Analysis to Evaluate Botnet Resilience, Apr. 23, 2013.
(Continued)

*Primary Examiner* — Amie C. Lin
(74) *Attorney, Agent, or Firm* — Van Pelt, Yi & James LLP

(57) ABSTRACT

Techniques for selective sinkholing of malware domains by a security device via DNS poisoning are provided. In some embodiments, selective sinkholing of malware domains by a security device via DNS poisoning includes intercepting a DNS query for a network domain from a local DNS server at the security device, in which the network domain was determined to be a bad network domain and the bad network domain was determined to be associated with malware (e.g., a malware domain); and generating a DNS query response to the DNS query to send to the local DNS server, in which the DNS query response includes a designated sinkholed IP address for the bad network domain to facilitate identification of an infected host by the security device.

15 Claims, 7 Drawing Sheets

Related U.S. Application Data continuation of application No. 14/068,305, filed on Oct. 31, 2013, now Pat. No. 9,325,735.

(51) Int. Cl.
| | |
|---|---|
| *G06F 12/16* | (2006.01) |
| *G08B 23/00* | (2006.01) |
| *H04L 29/06* | (2006.01) |
| *H04L 29/12* | (2006.01) |

(52) U.S. Cl.
CPC ........ *H04L 63/145* (2013.01); *H04L 63/1425* (2013.01); *H04L 63/20* (2013.01)

(58) Field of Classification Search
CPC ... H04L 63/145; H04L 63/14; H04L 63/1458; H04L 2463/144; H04L 63/1491
See application file for complete search history.

(56) References Cited

U.S. PATENT DOCUMENTS

| | | | |
|---|---|---|---|
| 7,958,555 B1* | 6/2011 | Chen | H04L 63/1483 726/22 |
| 8,141,157 B2 | 3/2012 | Farley | |
| 8,269,914 B2 | 9/2012 | Huo | |
| 8,561,177 B1 | 10/2013 | Aziz | |
| 8,566,928 B2 | 10/2013 | Dagon | |
| 8,631,489 B2 | 1/2014 | Antonakakis | |
| 8,826,444 B1* | 9/2014 | Kalle | G06F 21/552 726/26 |
| 9,356,942 B1 | 5/2016 | Joffe | |
| 9,363,282 B1 | 6/2016 | Yu | |
| 9,497,213 B2 | 11/2016 | Thompson | |
| 9,922,190 B2 | 3/2018 | Antonakakis | |
| 10,097,568 B2 | 10/2018 | Baughman | |
| 2004/0073640 A1 | 4/2004 | Martin | |
| 2006/0212925 A1 | 9/2006 | Shull | |
| 2008/0028463 A1* | 1/2008 | Dagon | H04L 63/1491 726/22 |
| 2008/0155694 A1* | 6/2008 | Kwon | H04L 29/12066 726/23 |
| 2009/0089426 A1 | 4/2009 | Yamasaki | |
| 2010/0192225 A1 | 7/2010 | Ma | |
| 2011/0078794 A1* | 3/2011 | Manni | G06F 21/566 726/23 |
| 2011/0283359 A1 | 11/2011 | Prince | |
| 2011/0283361 A1 | 11/2011 | Perdisci | |
| 2012/0303808 A1 | 11/2012 | Xie | |
| 2013/0080574 A1 | 3/2013 | Prince | |
| 2013/0174253 A1 | 7/2013 | Thomas | |
| 2013/0191915 A1 | 7/2013 | Antonakakis | |
| 2013/0232574 A1 | 9/2013 | Carothers | |
| 2014/0013434 A1 | 1/2014 | Ranum | |
| 2014/0068763 A1 | 3/2014 | Ward | |
| 2014/0068775 A1 | 3/2014 | Ward | |
| 2014/0075558 A1 | 3/2014 | Ward | |
| 2014/0090058 A1 | 3/2014 | Ward | |
| 2014/0143825 A1 | 5/2014 | Behrendt | |
| 2014/0245436 A1 | 8/2014 | Dagon | |
| 2014/0283063 A1 | 9/2014 | Thompson | |
| 2015/0007250 A1 | 1/2015 | Dicato, Jr. | |
| 2015/0143504 A1 | 5/2015 | Desai | |
| 2015/0281257 A1 | 10/2015 | Hart | |
| 2018/0351972 A1 | 12/2018 | Yu | |

OTHER PUBLICATIONS

Guy Bruneau, DNS Sinkhole, Aug. 7, 2010, Sans Institute InfoSec Reading Room, pp. 1-41.
Pedro Marques da Luz, Thesis, Botnet Detection Using Passive DNS, 2013/2014.
Seung Won Shin, Protecting Networked Systems from Malware Threats, Aug. 2013.
Dietrich et al., On Botnets That Use DNS for Command and Control, 2011 Seventh European Conference on Computer Network Defense, 2011, pp. 9-16.
Gavin E. Crooks, Inequalities Between the Jenson-Shannon and Jeffreys Divergences, 2008.
Greg Farnham, Detecting DNS Tunneling, SANS Institute Information Security Reading Room, Jun. 2012.
Nadler et al., Detection of Malicious and Low Throughput Data Exfiltration Over the DNS Protocol, Jun. 18, 2018.
Qi et al., A Bigram Based Real Time DNS Tunnel Detection Approach, Procedia Computer Science 17, 2013, pp. 852-860.
Alan Shaikh, Botnet Analysis and Detection System, Nov. 2010.
Antonakakis et al., DGAs and Cyber-Criminals: A Case Study, 2012.
Antonakakis et al., From Throw-Away Traffic to Bots: Detecting the Rise of DGA-Based Malware, 21st {USENIX} Security Symposium ({USENIX} Security 12), 2012, pp. 491-506.
Ivan Nikolaev, Network Service Anomaly Detection, Jun. 2014.
Martin Rataj, Simulation of Botnet C&C Channels, 2014.
Mustafa Toprak, Intrusion Detection System Alert Correlation with Operating System Level Logs, Dec. 11, 2009.
Schüppen et al., FANCI: Feature-based Automated NXDomain Classification and Intelligence, Proceedings of the 27th USENIX Security Symposium, Aug. 2018, pp. 1165-1181.
Sebastian Garcia, Identifying, Modeling and Detecting Botnet Behaviors in the Network, Nov. 2014.
Shehar Bano, A Study of Botnets: Systemization of Knowledge and Correlation-based Detection, Oct. 2012.
Xu et al., We Know it Before You Do: Predicting Malicious Domains, Sep. 2014.
Liu et al., CCGA: Clustering and Capturing Group Activities for DGA-Based Botnets Detection, 2019 18th IEEE International Conference on Trust, Security and Privacy in Computing and Communications/ 13th IEEE International Conference on Big Data Science and Engineering, Aug. 5, 2019, pp. 136-143.
Qi et al., BotCensor: Detecting DGA-Based Botnet Using Two-Stage Anomaly Detection, 2018 17th IEEE International Conference on Trust, Security and Privacy in Computing and Communications/ 12th IEEE International Conference on Big Data Science and Engineering, Aug. 1, 2018, pp. 754-762.

* cited by examiner

SELECTIVE SINKHOLING OF MALWARE DOMAINS BY A SECURITY DEVICE VIA DNS POISONING

CROSS REFERENCE TO OTHER APPLICATIONS

This application is a continuation of co-pending U.S. patent application Ser. No. 15/075,003, entitled SELECTIVE SINKHOLING OF MALWARE DOMAINS BY A SECURITY DEVICE VIA DNS POISONING, filed Mar. 18, 2016, which is a continuation of U.S. patent application Ser. No. 14/068,305, now U.S. Pat. No. 9,325,735, entitled SELECTIVE SINKHOLING OF MALWARE DOMAINS BY A SECURITY DEVICE VIA DNS POISONING, filed Oct. 31, 2013, both of which are incorporated herein by reference for all purposes.

BACKGROUND OF THE INVENTION

Malicious software (malware) generally refers to unwanted, hostile, or intrusive software that can be used to disrupt computer or network operation, collect private or sensitive information, or access private computer systems or networks. Malware can be in the form of executable code, scripts, active content, and other software. Example malware includes computer viruses, worms, trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
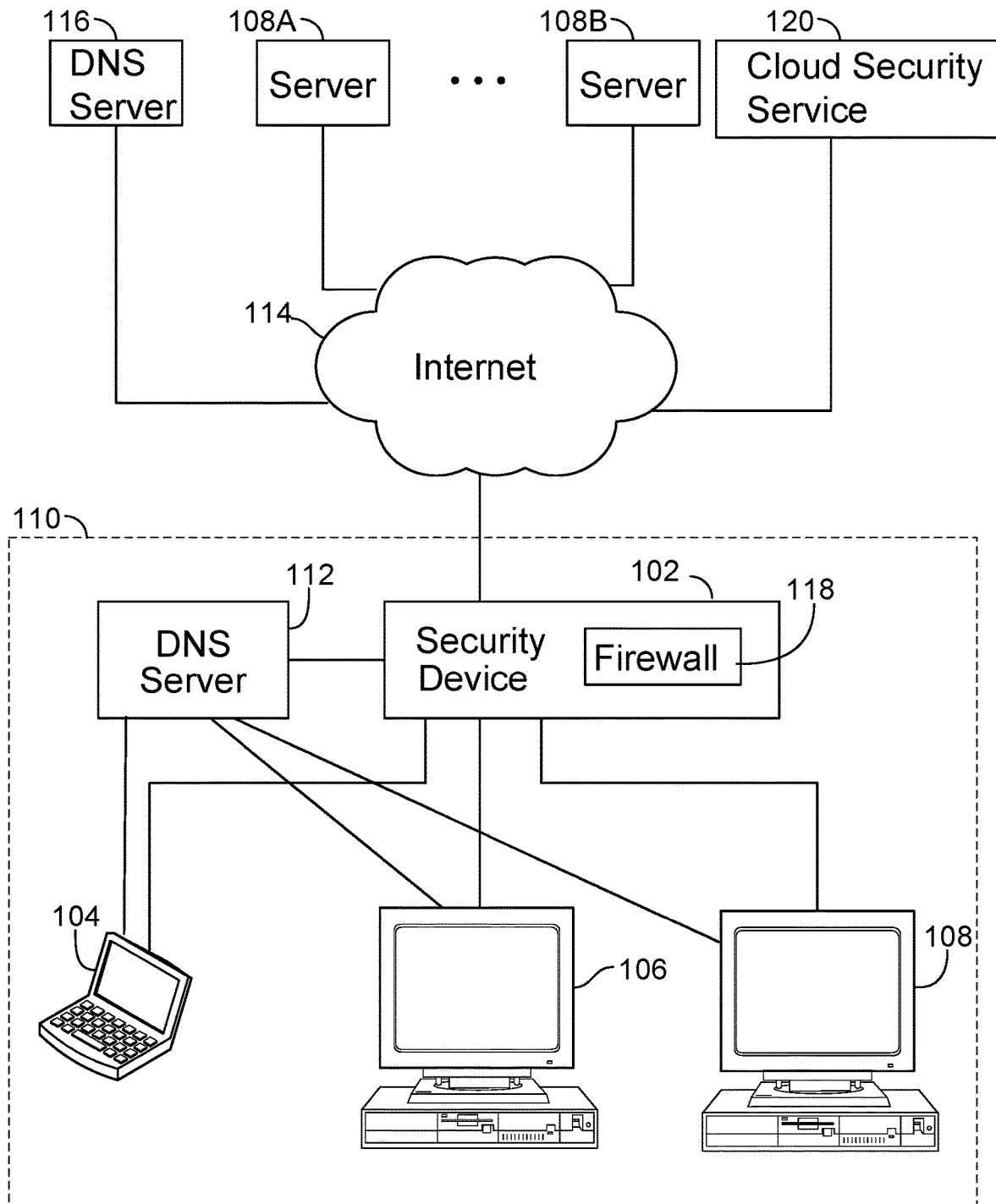
FIG. 1 is a functional block diagram illustrating an architecture for selective sinkholing of malware domains by a security device via DNS poisoning in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malicious software (malware) generally refers to unwanted, hostile, or intrusive software that can be used to disrupt computer or network operation, collect private or sensitive information, or access private computer systems or networks. Malware can be in the form of executable code, scripts, active content, and other software. Example malware includes computer viruses, worms, trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

A network domain generally refers to a domain that is identified by a domain name. A domain name typically includes an identification string (e.g., www.example-website.com) that defines a realm of authority or control for a domain on the Internet. Domain names are generally formed by rules and procedures of the Domain Name System (DNS). A domain name can be registered in the DNS as a domain name.

Network domains can be used in various networking contexts and application-specific naming and addressing purposes. For example, a domain name can be used to identify an Internet Protocol (IP) resource, such as a web site (e.g., a server hosting a web site), or any other service accessible via the Internet (e.g., a File Transfer Protocol (FTP) resource or other services accessible via the Internet).

A DNS service can be used to translate a domain name into an IP address. For example, when a user types in a domain name (e.g., an Internet or Intranet domain name), such as example.com, using a web browser, an authoritative DNS server can translate the domain name into an IP address, such as 172.16.254.1 (for IPv4) and 2001:db8:0:1234:0:567:8:1 (for IPv6). However, if a user attempts to perform a DNS lookup or host command on an unregistered or invalid domain name, such as examplefakedomain.com, then an error can be received indicating that such is a non-existing domain name, or in other words, that such is a non-existent domain (NXDOMAIN). Generally, an NXDOMAIN is a condition or error that can be indicated for an Internet domain name that is unable to be resolved using the DNS servers (e.g., invalid domain name) or that the Internet domain name is not yet registered. In some cases, an NXDOMAIN can also be indicated due to a network or DNS server problem.

Network domains can also be used by malware. For example, malware can be distributed or propagated using a network domain, such as www.bad-malware-download-site.com. As another example, botnet C&C related malware can be associated with a network domain, such as www.botnet-site.com. Various commercial efforts as well as open project efforts exist to provide listings of network domains that are known to be used to distribute or propagate malware. Some approaches use such network domain listings to provide spoofed replies, in response to any requests to a network domain on such a listing, as a mechanism for preventing propagation of malware distribution.

Blackholing is a technique that can be used to send all traffic (e.g., network communications) to a network domain (e.g., DNS or IP address) to a null interface or non-existent server (e.g., sometimes referred to as a black hole). For example, an Internet Service Provider (ISP) can manage such blackholing for efficiency and to avoid affecting network connectivity. However, while blackholing may be efficient for certain types of severe network attacks, such an approach fails to allow for analysis of the traffic to the blackholed network domain.

Thus, existing approaches fail to identify hosts that are infected with malware. Also, existing approaches fail to determine that a given host that attempts to connect to a network domain is infected with an identified malware (e.g., a previously identified, known version of malware).

What are needed are new and improved techniques for identifying and monitoring network domains that are associated with malware (e.g., bad network domains).

Sinkholing generally refers to a technique for routing traffic (e.g., network communications) to a valid IP address. For example, a network device (e.g., server or appliance) associated with the valid IP address can receive the traffic that was directed to the sinkholed IP address that is associated with the network domain. The network device that receives the traffic can analyze the traffic. Based on the analysis of the traffic, the network device can then perform an action (e.g., reject bad packets or perform some other action).

If a domain associated with malware (e.g., a malware domain) is a non-existent domain (NXdomain), then sinkholing that domain would typically require registering the domain in order to associate the domain with a valid IP address, such as an IP address controlled by a security provider or another entity that is not associated with the malware author. If a malware domain is registered to, for example, a malware author, then sinkholing that domain would typically require attempting to take over the domain by changing the public registration of the domain in order to associate the domain with another IP address, such as controlled by a security provider or another entity that is not associated with the malware author. Thus, sinkholing techniques typically require actually registering such a malware domain.

For example, when a client machine is infected with botnet related malware, the malware typically produces command-and-control (C&C) traffic to send information back to the attacker. Often the malware will resolve a domain name via DNS to learn what IP address to reach out to as the C&C server. The DNS resolver will respond in good faith with the IP address(es) assigned to that domain name. Once the domain is resolved to an IP address, the malware opens a network session to that IP address to establish communications with the attacker. A firewall can be configured to block or alert on DNS queries to known malicious domain names. However, if the firewall is deployed north of the local DNS server, then the firewall loses visibility of the true client that originated the DNS query, and the source of the DNS request appears to be the DNS server. Thus, the firewall cannot determine the true infected client, because the identity is hidden by the DNS server forwarding the request on behalf of the client.

In particular, if a security device (e.g., a perimeter security device that executes a firewall for protecting a network, such as an enterprise network) does not intercept host requests (e.g., DNS queries) from local hosts (e.g., client devices) to a local DNS server, then this results in a visibility problem when the security device (e.g., a perimeter security device) is so-called north of the local DNS server(s). In other words, the problem is that DNS-based signatures cannot identify the infected host (e.g., to a network or security administrator) in many deployments, because if the firewall is north of the local DNS resolver (e.g., the local DNS server), these signatures identify the local DNS server as the originator of the query. Specifically, in this case, the security device would not be able to determine which local host submitted a DNS query for a particular domain (e.g., a bad network domain) as the DNS query for that domain is sent from the local host to the local DNS server. If data for generating a DNS response to that DNS query is not locally cached, then the local DNS server would typically forward the DNS query to a public DNS server (e.g., a remote DNS server) via the Internet. This forwarded DNS query would, in this example, pass through the security device before being communicated via the Internet, but the forwarded DNS query would not indicate which local host had originally submitted that DNS query initially sent to the local DNS server. As a result, the security device cannot then associate that DNS query for a bad network domain with the local host (e.g., client device or other local host) that requested the bad network domain. As such, a firewall with DNS signatures may trigger on the firewall, but such would indicate the local DNS that sent the DNS query that caused the DNS rule(s) to trigger, and thus, would not be able to identify the original requesting local host.

However, instead of requiring DNS logging (e.g., which can denigrate the performance of the local DNS server), and instead of requiring a re-architecture of the network to require routing of all local DNS packet queries to the local DNS server(s) to pass through the security device (e.g., which is a network re-architecture that may not be desired for many networks, such as enterprise networks), various new sinkholing related techniques can be used, as described herein.

Thus, what are needed are improved sinkholing techniques that can sinkhole the malware domain and facilitate identification of infected local hosts using a security device (e.g., a perimeter security device that includes a firewall).

Accordingly, techniques for selective sinkholing of malware domains by a security device via DNS poisoning are provided.

For example, various sinkholing techniques described herein include performing a local DNS cache pollution approach to change a DNS association of a malware domain to another IP address without requiring an actual registration of the malware domain (e.g., instead of just dropping the egress DNS query, the firewall can be configured to respond with a forged DNS response that causes the domain to resolve to an IP address of, for example, a network administrator's choosing). For example, such techniques can provide local, intel-driven sinkholing using local DNS cache pollution (e.g., malware domains can be determined to be associated with identified malware using a cloud security service), as further discussed below. Also, using such techniques can facilitate identification of infected hosts on a network by a security device (e.g., a perimeter security device protecting the network), in which the security device would not typically have visibility into client DNS requests from such infected hosts (e.g., if a local DNS server handles such local client DNS requests and DNS logging is not enabled on the local DNS server, which is often not enabled due to performance costs associated with DNS logging on the local DNS server, and such DNS traffic is not routed through the perimeter security device as that would typically require a network architecture change for most enterprise networks), as further discussed below. As such, this approach effectively pollutes the DNS cache of the local DNS resolver, and in turn, the infected client, by pointing the malicious domain to a specific, known IP address so that infected hosts can be identified by reviewing traffic logs to find hosts that attempt to establish sessions with that specific IP address.

In some embodiments, selective sinkholing of malware domains by a security device via DNS poisoning includes intercepting a DNS query for a network domain from a local DNS server at the security device, in which the network domain was determined to be a bad network domain and the bad network domain was determined to be associated with malware (e.g., a malware domain, which can include network domains that have been determined to be associated with identified malware—known malware, such as by using a cloud security service to analyze network activities of the identified malware); and generating a DNS query response to the DNS query to send to the local DNS server, in which the DNS query response includes a designated sinkholed IP address for the bad network domain to facilitate identification of an infected host by the security device. In some cases, the designated sinkholed IP address can be a predetermined, non-existent IP address. In other cases, the designated sinkholed IP address can be a predetermined, reserved IP address that can be used to provide a network device that is configured with the reserved IP address that can also be configured as a honeypot or sandbox for monitoring network activities of the malware executing on the infected host.

For example, a cache of the local DNS server can be polluted with a designated sinkholed IP address for the bad network domain. In particular, by polluting the cache of the local DNS server with a designated sinkholed IP address for the bad network domain (e.g., www.malware-download-site.com), the security device (e.g., a server or appliance, which can execute a firewall) can be configured to then monitor for host connection attempts to the sinkholed IP address, which can be logged (e.g., logging session records, which can be stored for analysis and reporting of infected hosts). Accordingly, this approach allows for the security device to identify hosts that are infected with malware (e.g., identified malware) based on logged host connection attempts to the sinkholed IP address as that sinkholed IP address was provided for the bad network domain that was previously determined to be associated (e.g., uniquely associated) with malware (e.g., identified malware).

In one embodiment, selective sinkholing of malware domains by a security device via DNS poisoning further includes generating a spoofed DNS query response, in which a local DNS server cache is polluted with the designated sinkholed IP address for the bad network domain. In particular, sinkholing DNS queries can include forging responses to select DNS queries so that clients on the network connect to a specified host rather than the actual host pointed to by DNS. For example, the security device can be configured to generate a spoofed DNS query response (e.g., using a predetermined IP address for a bad network domain, such as www.botnet-malware-domain.com) to the DNS query as a mechanism to pollute a cache of a local DNS server. In some implementations, the time to live (TTL) for the DNS query response (e.g., a spoofed DNS query response) can be set to a predetermined period of time, such as 1 second (TTL=1) in order to require subsequent queries from local hosts to the local DNS server for that bad network domain to have to result in a local DNS server cache miss so that another DNS query is communicated to a public DNS server in order to allow the security device to intercept any such subsequent DNS queries for that bad network domain from that host or other local hosts. The security device can then filter (e.g., apply a filtering rule, such as using a firewall rule) to identify any hosts that attempt to communicate with the predetermined IP address provided in that spoofed DNS query response. This allows the security device to identify and log which host(s) attempt to communicate with that bad network domain based on any host attempts to communicate with the predetermined IP address (e.g., by querying session logs that can identify hosts associated with bad network domain based on session requests associated with the predetermined IP address, in which such session logs are maintained by the security device). In some implementations, the bad network domain can be determined to be a bad network domain based on prior analysis (e.g., by a security service, such as a cloud security service) that the network domain is associated with malware (e.g., identified malware). In addition, the predetermined IP address can be a non-existent IP address or a reserved IP address. If it is a non-existent IP address, then the host(s) would not be able to communicate with the bad network domain. If it is a reserved IP address, then the IP address can be associated with a server (e.g., a local server that can effectively function as a honeypot or sandbox) such that network analysis can be performed locally on the network traffic from infected host(s) to the bad network domain.

In one embodiment, selective sinkholing of malware domains by a security device via DNS poisoning further includes polluting a local DNS server cache with the designated sinkholed IP address for the bad network domain to facilitate identification of an infected host by the security device. For example, the security device can be an appliance, server, or other networking device that can execute a firewall. The security device can identify a host that is infected with identified malware by intercepting a session request from the host to communicate with the designated sinkholed IP address.

In one embodiment, the bad network domain was determined to be associated with an identified malware (e.g., using a security service, such as a cloud security service), and selective sinkholing of malware domains by a security device via DNS poisoning further includes identifying that a host (e.g., a local host) is infected with the identified malware based on a request from the host to connect to the designated sinkholed IP address. In some implementations, infected hosts can then be managed appropriately, such as quarantining the hosts, disinfecting the hosts, reporting that the hosts are infected with the identified malware to a network/security administrator and/or user, and/or performing some other responsive action(s).

In one embodiment, selective sinkholing of malware domains by a security device via DNS poisoning further includes receiving a content update that includes a firewall signature for the bad network domain (e.g., using the designated sinkholed IP address). For example, if the designated sinkholed IP address for the bad network domain is a non-existent IP address, then a rule can be configured and applied using the security device (e.g., firewall implemented using the security device) to drop packets that result in a destination IP address match with the designated sinkholed IP address. Also, such traffic can be logged as further described herein.

In one embodiment, selective sinkholing of malware domains by a security device via DNS poisoning further includes generating a log for each attempted host connection to the designated sinkholed IP address. For example, the source IP address (e.g., and/or other identifier information associated with a host requesting a session connection to the designated sinkholed IP address) can be logged so that infected hosts can be identified and reported based on such logged session traffic using the security device.

In one embodiment, selective sinkholing of malware domains by a security device via DNS poisoning further includes parsing the DNS query to extract the network domain; and performing a lookup of the network domain to determine that the network domain is associated with the bad network domain. For example, the security device can decode DNS queries using an APP-ID engine to extract the domain name and determine whether the extracted domain name matches a known bad network domain.

In one embodiment, selective sinkholing of malware domains by a security device via DNS poisoning further includes performing a lookup of the network domain to determine that the network domain is associated with the bad network domain. For example, a cloud security service can periodically publish content updates that include a list of bad network domains that can be used by the security device.

In one embodiment, selective sinkholing of malware domains by a security device via DNS poisoning further includes dropping a packet that is sent to the designated sinkholed IP address. In some implementations, the designated sinkholed IP address can be set to a loopback address to effectively cut off communication to the designated sinkholed IP address (e.g., default values for designated sinkholed IP addresses can be configured to be loopback addresses).

In one embodiment, selective sinkholing of malware domains by a security device via DNS poisoning further includes logging a packet that is sent to the designated sinkholed IP address. For example, logging can be to generate a session log entry that can indicate an identifier of the local host that sent the packet to the designated sinkholed IP address.

In one embodiment, selective sinkholing of malware domains by a security device via DNS poisoning further includes generating an alert if a packet is sent to the designated sinkholed IP address. For example, the alert can indicate an identifier of the local host that sent the packet to the designated sinkholed IP address.

In one embodiment, selective sinkholing of malware domains by a security device via DNS poisoning further includes generating a spoofed DNS query response, in which the query ID value matches the query ID provided in the DNS query, and the source port becomes the destination port (e.g., so that the spoofed DNS query response complies with DNS security features/keys). In some implementations, a Time To Live (TTL) value for the spoofed DNS query response is set to a predetermined period of time, such as 1 second (TTL=1) to avoid polluting cache longer than desired.

In one embodiment, selective sinkholing of malware domains by a security device via DNS poisoning further includes generating a report based on the designated sinkholed IP address to identify the infected local hosts. For example, the security device can report which local hosts are infected with identified malware associated with the bad network domain based on the logged session requests from those local hosts to the designated sinkholed IP address. Thus, the various sinkholing techniques described herein allow administrators to quickly identify infected hosts on the network using DNS traffic, in which infected hosts can be identified from traffic logs and reports. For example, any hosts that attempt to connect to the sinkhole host (e.g., assumed not to be contacted for any legitimate purpose) are infected with malware.

For example, selective sinkholing of malware domains by a security device via DNS poisoning allows administrators (e.g., network or security administrators) to quickly identify infected hosts on the network using DNS traffic. A security device can be configured to implement anti-malware signatures and DNS-based signatures that trigger on DNS queries for malware domains. However, these signatures can identify a network's local DNS resolver (e.g., local DNS server) as the source of the traffic rather than the actual infected host if the firewall is north of the local DNS server, because the firewall cannot see the originator of the query. Accordingly, using techniques described herein include spoofing responses (e.g., forging responses) to DNS queries to malware domains so that clients on the network attempt to connect to a specified host rather than the actual host pointed to by DNS. Infected hosts can then be identified from traffic logs maintained by the security device. Any hosts that attempt to connect to the sinkholed bad domain (e.g., assumed not to be contacted for any legitimate purpose) can be determined to be infected with malware. In some implementations, administrators can enable sinkholing for a DNS signature collection by selecting a sinkhole action in a DNS signatures tab of an antimalware profile (e.g., and can specify what IPv4 and IPv6 address to sinkhole to, in some cases, the default value can be the local host). The security device can then identify infected clients by filtering the traffic logs or generating a custom report that checks for sessions to the specified IP address (e.g., the designated sinkholed IP address).

Accordingly, these and various other techniques described herein can be used to provide local, intel driven sinkholing via cache pollution of a local DNS server cache and can also be used to identify infected hosts based on monitoring session traffic to the sinkholed IP address using the security device (e.g., to identify infected hosts using a security device from a network position that is north of the local DNS resolver).

FIG. 1 is a functional block diagram illustrating an architecture for selective sinkholing of malware domains by a security device via DNS poisoning in accordance with some embodiments. As shown, a security device 102 is at the perimeter of a protected network 110, which includes client devices (e.g., clients) 104, 106, and 108. For example, security device 102 can include a firewall function, such as firewall 118 as shown, to protect the network and clients within network 110, which is in communication with the Internet 114 and various servers, such as DNS server 116, and other Internet resources/servers shown as 108A and 108B (e.g., web servers, mail servers, file servers such as an FTP server, and/or other types of resources/servers). For example, security device 102 can be implemented as a data appliance or a server that can perform various security functions, including firewall 118. Security device 102 is also in communication with a cloud security service 120 via Internet 114 as shown. In some implementations, security device 102 is implemented using a data appliance (e.g., a security appliance), a gateway (e.g., a security server), a server (e.g., a server that executes security software including firewall 118), and/or some other security device, which, for example, can be implemented using computing hardware, software, or various combinations thereof.

In some implementations, one or more of clients 104, 106, and 108 can include a firewall (e.g., host-based firewall). For example, clients 104, 106, and 108 can include various computing devices that can access the Internet via wired and/or wireless communications, such as computers, laptops, tablets, smart phones, and/or various other types of computing devices with network communication capabilities. As is also shown, Internet resources/servers shown as 108A and 108B are in communication with the Internet 114. For example, a client device can access a service provided by a server via the Internet, such as a web related service (e.g., web sites, cloud-based services, streaming services, or email services), peer-to-peer related service (e.g., file sharing), IRC service (e.g., chat service), and/or any other service that can be delivered via the Internet.

As is also shown in FIG. 1, clients 104, 106, and 108 are also in communication with a local DNS server 112 of network 110. For example, DNS server 112 can perform a DNS service to translate a domain name into an IP address. For example, when a user types in a domain name (e.g., an Internet or Intranet domain name), such as example.com, using a web browser on a client (e.g., client 104, 106, or 108), an authoritative DNS server can translate the domain name into an IP address, such as 172.16.254.1 (for IPv4) and 2001:db8:0:1234:0:567:8:1 (for IPv6). If DNS server 112 does not have a locally cached result for the requested domain name, then DNS server 112 can communicate to another DNS server, such as DNS server 116 via Internet 114 to obtain the translation for the domain name into an IP address (e.g., note that the communication between DNS server 112 and DNS server 116 passes through security device 102 as shown). In contrast, DNS requests from clients 104, 106, and 108 to local DNS server 112 are not required to pass through security device 102 as shown for the network architecture for network 110 (e.g., the security device is north of the local DNS resolver). As similarly discussed above, if a user or client attempts to perform a DNS lookup or host command on a domain name that is a known bad network domain (e.g., a malware domain), such as bad-host.malware-domain.com, then various techniques for selective sinkholing of malware domains by a security device via DNS poisoning can be implemented as further described below.

In particular, security device 102 can be used for implementing various techniques for selective sinkholing of malware domains by a security device via DNS poisoning as described herein with respect to various embodiments. For example, security device 102 can periodically send malware samples to cloud security service 120, which can use such malware samples to identify malware and associated bad network domain(s) (if any).

As another example, security device 102 can be configured for sinkholing bad network domains (e.g., a firewall, configured with DNS signatures that trigger on DNS queries directed at malware domains, can also be configured to perform various actions for DNS lookups to bad network domains, including, for example, alerts, allow, sinkhole, or default (block)). In particular, if a bad network domain is sinkholed using a designated sinkholed IP address, then the security device can be configured to detect client requests for bad network domains from cloud security service 120 based on the designated sinkholed IP address and can log events (e.g., in a session log) based on monitored network traffic passing through security device 102. As a result, the session log data can be used to identify and report on infected hosts on the network.

Thus, the sinkhole action provides administrators with a mechanism for identifying infected hosts on the network using DNS traffic, even when the firewall is north of a local DNS server (e.g., the firewall cannot see the originator of the DNS query). In particular, selective sinkholing of malware domains by a security device via DNS poisoning solves this visibility problem by spoofing responses to the DNS queries directed at malware domains, so that clients attempting to connect to malware domains (e.g., for command-and-control, malware downloads, or other potentially malicious activities) instead attempt connections to a designated sinkholed IP address (e.g., an IP address specified by the administrator, such as an IP address that results in a session having to be routed through the firewall in order for the firewall to see the session, for example, an unused IP in another internal zone). Infected hosts can then be easily identified in the traffic logs (e.g., based on querying such traffic logs or using a report generator that reports on such infected hosts based on querying such traffic logs that check for sessions to the specified IP address), because any host that attempts to connect to the sinkhole IP are most likely infected with malware.

Figure 2:
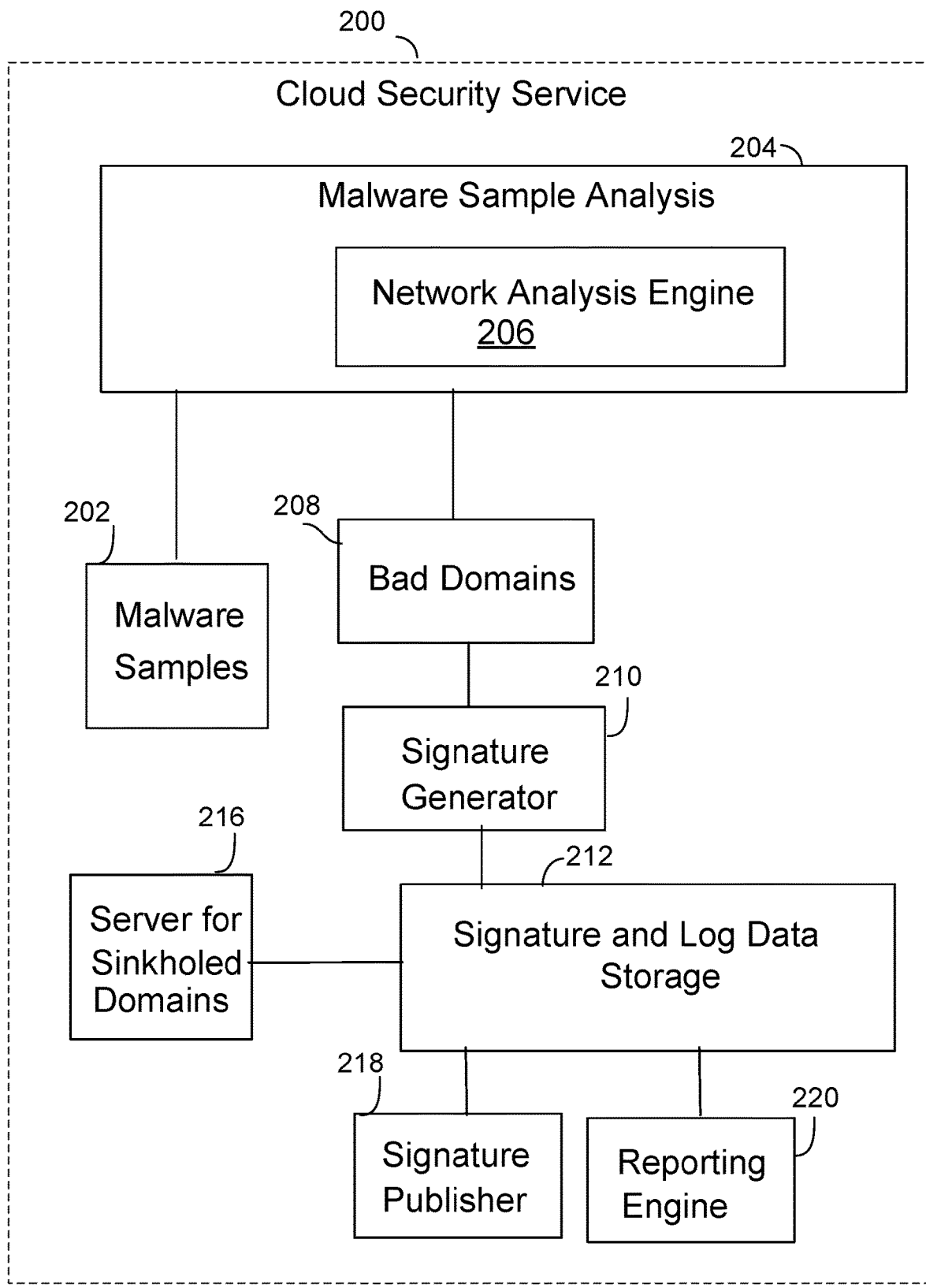
FIG. 2 is a functional block diagram illustrating a cloud security service for selective sinkholing of malware domains by a security device via DNS poisoning in accordance with some embodiments.

FIG. 2 is a functional block diagram illustrating a cloud security service for selective sinkholing of malware domains by a security device via DNS poisoning in accordance with some embodiments. In particular, cloud security service 200 is in communication with the Internet. For example, cloud security service 120 of FIG. 1 can be implemented as cloud security service 200 as shown in FIG. 2.

Referring to FIG. 2, cloud security service 200 includes malware samples 202 (e.g., executable files, Microsoft Office® files, Adobe PDF® files, Java files, and/or other types of files), which can be received from various customers (e.g., firewall 118 as shown in FIG. 1 and/or other firewalls or security devices from one or more customers of the cloud security service). Malware samples 202 are provided to malware sample analysis 204. Malware sample analysis 204 includes a network analysis engine 206. For example, when executing a malware sample using the malware sample analysis 204, which can be implemented as a virtualized environment for dynamic analysis of malware, whether the malware sample is determined to be malware can be performed using various malware detection techniques (e.g., based on identification of malicious behaviors, such as malicious network activity, exploits, software vulnerabilities, and/or other malicious behaviors including using heuristic-based behavioral analysis techniques). Also, malware sample analysis 204, using network analysis engine 206, can identify malware domains (if any) that the malware sample attempts to access, which can be logged and sent to bad network domains 208 (e.g., by logging all DNS/domain query traffic during emulation of the identified malware, which generates a source of bad network domains list associated with the identified malware). For example, whether each of the bad network domains has been registered (e.g., by the malware developer) can be determined (e.g., if a DNS lookup receives an NXDOMAIN response, then it can be determined that the bad network domain has not been registered). In some implementations, the cloud security service can register any such unregistered bad network domains to sinkhole such bad network domains (e.g., using sinkholed IP addresses, that is, valid IP addresses that are associated with, for example, one or more servers controlled by cloud security service 200, such as server 216 as shown). In other implementations, the sinkholed IP address can be selected to be a local IP address for a server or other network device on the local network (e.g., local network 110) and implemented using local DNS poisoning techniques as described herein, so that the local network administrator can provide a local honeypot or sandbox for analyzing behaviors of the malware, which also avoids having to formally register or change the public registration of the bad network domain.

This approach also can uniquely associate an identified malware sample with one or more bad network domains, such that a host attempt to connect to such bad network domains can be used to determine that such hosts are infected with the identified malware sample, as similarly discussed above with respect to FIG. 1. For example, such signatures are triggered by a client device (e.g., client device 104, 106, or 108 as shown in FIG. 1) attempting to connect to a sinkholed IP address that triggers a signature implemented by the local firewall (e.g., firewall 118 as shown in FIG. 1), which can then also be used to determine that the client device is infected with identified malware, such that a responsive action can be performed (e.g., the client device can be disinfected, quarantined, reported to a network/security administrator for the network, the client device's attempt(s) to connect to the bad network domains(s) can be blocked, and/or some other responsive action).

As is also shown in FIG. 2, signature generator 210 generates DNS-based signatures (e.g., DNS signatures) for each of the bad network domains in bad domains 208. These signatures are stored in signature and log data storage 212 (e.g., in some implementations, log data and signature data can be stored in separate data stores, such as different databases or other types of data stores) and can be distributed to security devices (e.g., security devices that include firewalls, such as security device 102 of FIG. 1) of customers of cloud security service 200 using signature publisher 218.

In some implementations, cloud security service can include a server 216 (e.g., or multiple servers or appliances) that can be associated with one or more sinkholed IP addresses for bad network domains by actually registering the bad network domains to valid IP address(es) controlled by the cloud security service provider. As a result, any attempts by hosts (e.g., clients 104, 106, or 108 as shown in FIG. 1, or other hosts, even if such are hosts that are not associated with customers of the cloud security service) can be determined using server for sinkholed domains 216 and logged to signature and log data storage 212 (e.g., or in some implementations, stored in a separate data store). Cloud security service 200 can uniquely associate an identified malware sample with one or more bad network domains, such that host attempts to connect to such bad network domains can be used to determine that such hosts are infected with the identified malware. Reporting engine 220 is configured to automatically report to customers (e.g., or others who may not be current customers) which host(s) are infected with identified malware based on logged attempts to connect to sinkholed IP addresses that are associated with bad network domains. Accordingly, this approach allows the cloud security service provider to use sinkholed domains to report which clients are infected with identified malware even for hosts that are not associated with a customer, as the cloud security service provider controls the IP addresses for the sinkholed domain such that traffic is directed to a network resource (e.g., server 216 as shown in FIG. 2) for monitoring, logging, and reporting which hosts attempt connections (e.g., client devices infected with malware-Sample-X that is sending C&C traffic to malware-bad-site-3.com) to such sinkholed bad domains.

Figure 3:
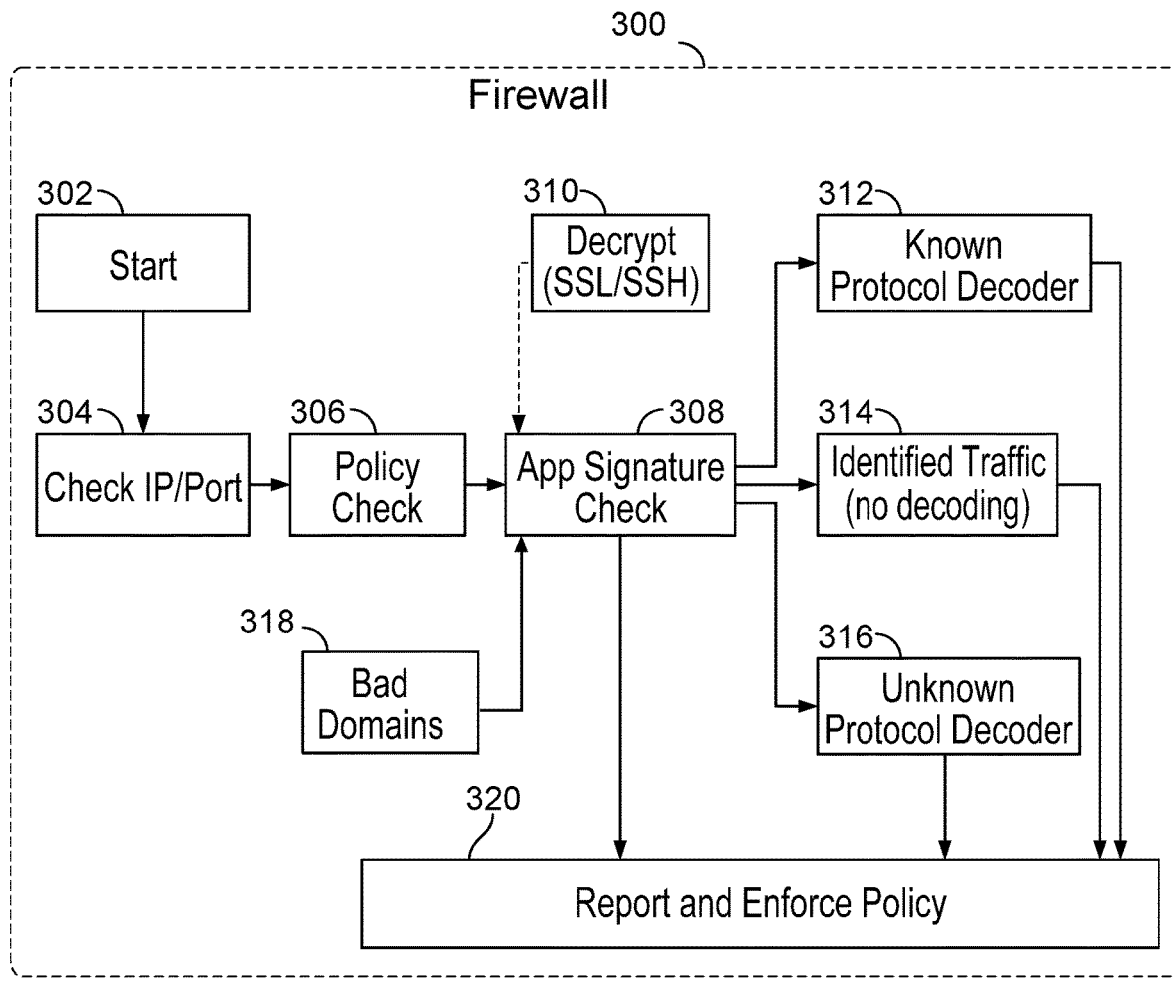
FIG. 3 is a functional block diagram illustrating a firewall for selective sinkholing of malware domains by a security device via DNS poisoning in accordance with some embodiments.

FIG. 3 is a functional block diagram illustrating a firewall for selective sinkholing of malware domains by a security device via DNS poisoning in accordance with some embodiments. In particular, security device 300 is in communication with the Internet. For example, firewall 118 of FIG. 1 can be implemented as firewall 300 as shown in FIG. 3.

In one embodiment, network traffic is monitored using a server (e.g., a computer server that includes security functions, such as a firewall executed on a processor(s) of the computer server). In one embodiment, network traffic is monitored using an appliance (e.g., a data appliance that includes security functions, such as a security appliance that includes a firewall executed on a processor(s) of the appliance). In one embodiment, network traffic is monitored using a gateway (e.g., a gateway that includes security functions, such as a security gateway). In one embodiment, network traffic is monitored using a host (e.g., security software executed on a host device, such as a network server or client computing device, such as a personal computer, laptop, tablet, or smart phone). In one embodiment, the network traffic is monitored using pass through (e.g., in-line) monitoring techniques. In one embodiment, the network traffic is collected and/or monitored for events and/or reporting based on events (e.g., some of the network traffic can be monitored using pass through techniques and/or some of the network traffic can be collected and analyzed for monitoring the network traffic offline, such as in logs of network traffic) as further described herein with respect to various embodiments.

In one embodiment, network traffic is monitored using a state-based firewall. In particular, the state-based firewall can monitor traffic flows using an APP-ID engine, shown as App Signature Check 308). For example, the monitored network traffic can include HTTP traffic, FTP traffic, DNS requests, unclassified application traffic (e.g., unknown application traffic), and/or other types of traffic (e.g., traffic using other types of known or unknown protocols).

Referring to FIG. 3, network traffic monitoring begins at 302. An IP address and port engine 304 determines an IP address and port number for a monitored traffic flow (e.g., a session) based on packet analysis. A policy check engine 306 determines whether any policies can be applied based on the IP address and port number. For example, if a packet has a destination IP address that matches a designated sinkholed IP address, then this can be used to apply a sinkholing policy, such as to drop the packet and to log data associated with the session (e.g., in a session log so that the host associated with the packet is identified in the session log, which can be used to identify the host as an infected host).

As is also shown in FIG. 3, an application signature check engine 308 identifies an application (e.g., using an APP-ID engine using various application signatures for identifying applications based on packet flow analysis). For example, APP-ID engine 308 can be configured to determine what type of traffic the session involves, such as HTTP traffic, FTP traffic, DNS requests (e.g., a DNS query request), unknown traffic, and various other types of traffic, and such classified traffic can be directed to an appropriate decoder, such as decoders 312, 314, and 316, to decode the classified traffic for each monitored session's traffic flow. As discussed above, DNS signatures can be applied at APP-ID engine 308 using bad domains data store 318 (e.g., a table, list, or other data store of bad domains, which can be in the form of signatures, such as DNS signatures). For example, bad domains can be periodically received (e.g., daily, hourly, or based on some other period of time or upon request) from a cloud security service (e.g., cloud security service 120 of FIG. 1) that provides firewall 300 with content updates (e.g., including signature updates, such as bad domain data including DNS signatures). In some implementations, bad domains data store 318 can be implemented as part of the signature engine, which can be implemented during protocol decoding (312), instead of during app signature check (308). In addition, if the monitored traffic is encrypted (e.g., encrypted using SSL, SSH, or another known encryption protocol), then the monitored traffic can be decrypted using a decrypt engine 310 (e.g., applying man in the middle techniques using a self-signed certificate). A known protocol decoder engine 312 decodes and analyzes traffic flows using known protocols (e.g., applying various signatures for the known protocol) and reports the monitored traffic analysis to a report and enforce policy engine 320. Identified traffic (no decoding required) engine 314 reports the identified traffic to the report and enforce policy engine 320. An unknown protocol decoder engine 316 decodes and analyzes traffic flows (e.g., applying various heuristics) and reports the monitored traffic analysis to the report and enforce policy engine 320. For example, triggered DNS signatures can be reported and enforced using report and enforce policy 320.

As an example, APP-ID engine 308 of firewall 300 can decode packets to parse and identify DNS queries (e.g., UDP port 53 is typically associated with DNS protocol traffic). A network domain can be extracted from the DNS query. A lookup of the extracted network domain can be performed to determine if the extracted network domain matches any bad domains identified in bad domains 318 (e.g., a table or list of bad network domains). If the extracted network domain matches a bad domain identified in bad domains 318, then the extracted network domain is determined to be a bad network domain and is eligible for sinkholing (e.g., sinkholing using local DNS poisoning). If the bad network domain is selected for sinkholing (e.g., an administrator configures the bad network domain for a sinkholing action), then the firewall spoofs a DNS response to the DNS query. The DNS response includes a designated sinkholed IP address (e.g., with a configured TTL, such as TTL=0 or some other TTL value, which can be selected to avoid polluting cache for an extended period of time). As discussed above, if a local host then attempts to connect to the designated sinkholed IP address, then the firewall can perform a policy check 306 based on the designated sinkholed IP address, which is identified at check IP/port 304, which allows firewall 300 to identify the infected host (e.g., in a session log that associates the host with the designated sinkholed IP address).

In some implementations, various other functional architectures and flows are provided to implement the policy enforcement using techniques described herein. For example, some of these functions can be implemented in software executed on a general processor and/or some of these functions can be implemented using hardware acceleration techniques for faster packet processing of network traffic.

Figure 4:
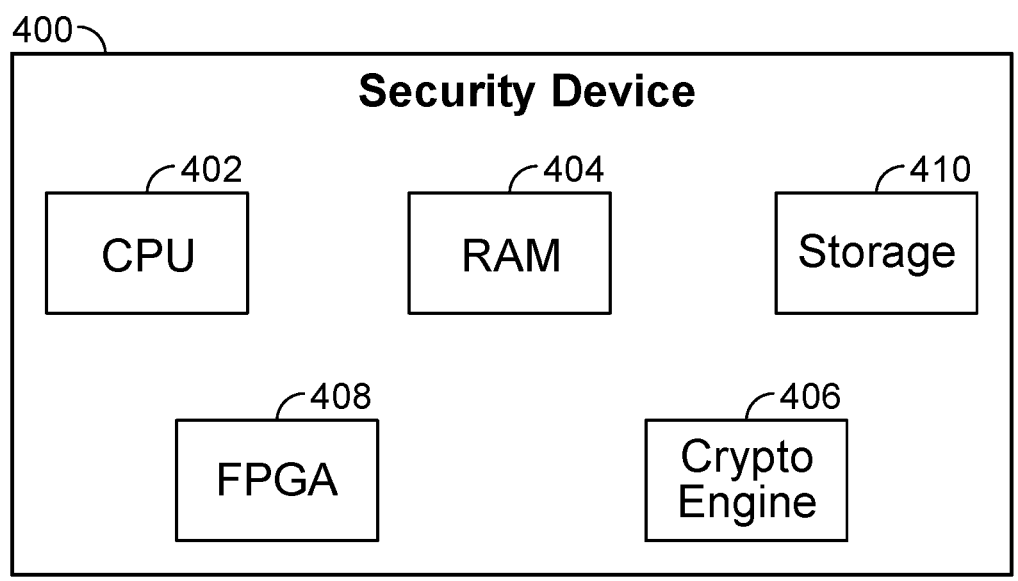
FIG. 4 is a functional diagram of hardware components of a security device for selective sinkholing of malware domains by a security device via DNS poisoning in accordance with some embodiments.

FIG. 4 is a functional diagram of hardware components of a security device for selective sinkholing of malware domains by a security device via DNS poisoning in accordance with some embodiments. The example shown is a representation of physical components that can be included in security device 400 (e.g., a data appliance, server, gateway, or other computing device). Specifically, security device 400 includes a high performance multi-core CPU 402 and RAM 404. Security device 400 also includes a storage 410 (e.g., one or more hard disks or solid state storage units), which is used to store policy and other configuration information as well as signatures (e.g., DNS signatures and/or other signatures that can be used by the security device, such as for firewall related functions). Security device 400 can also include one or more optional hardware accelerators. For example, security device 400 can include a cryptographic engine 406 configured to perform encryption and decryption operations, and one or more FPGAs 408 configured to perform signature matching, act as network processors, and/or perform other tasks.

Figure 5:
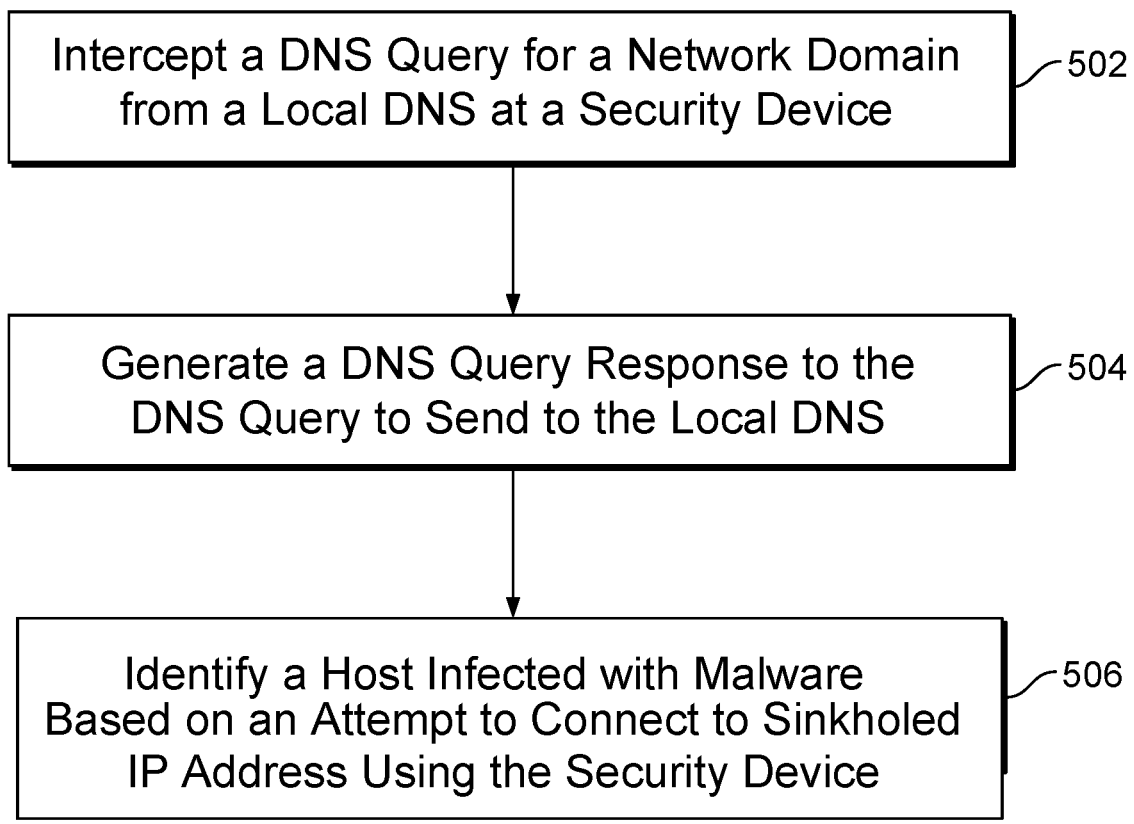
FIG. 5 is a flow diagram illustrating a process for selective sinkholing of malware domains by a security device via DNS poisoning in accordance with some embodiments.

FIG. 5 is a flow diagram illustrating a process for selective sinkholing of malware domains by a security device via DNS poisoning in accordance with some embodiments. At 502, intercepting a DNS query for a network domain from a local DNS resolver (e.g., a local DNS server) at a security device is performed, in which the bad network domain was determined to be associated with malware (e.g., a malware domain). At 504, generating a DNS query response to the DNS query to send to the local DNS server is performed, in which the DNS query response includes a designated sinkholed IP address for the bad network domain to facilitate identification of an infected host by the security device. At 506, identifying a host infected with malware based on an attempt to connect to the designated sinkholed IP address is performed using the security device (e.g., based on logged host attempts to connect to the designated sinkholed IP address). For example, if the bad network domain was determined to be associated with an identified malware (e.g., malware that has been identified and has been determined to be associated with the bad domain), then the security device can generate a report or alert that indicates that the host that attempted to connect to the designated sinkholed IP address is infected with the identified malware.

Figure 6:
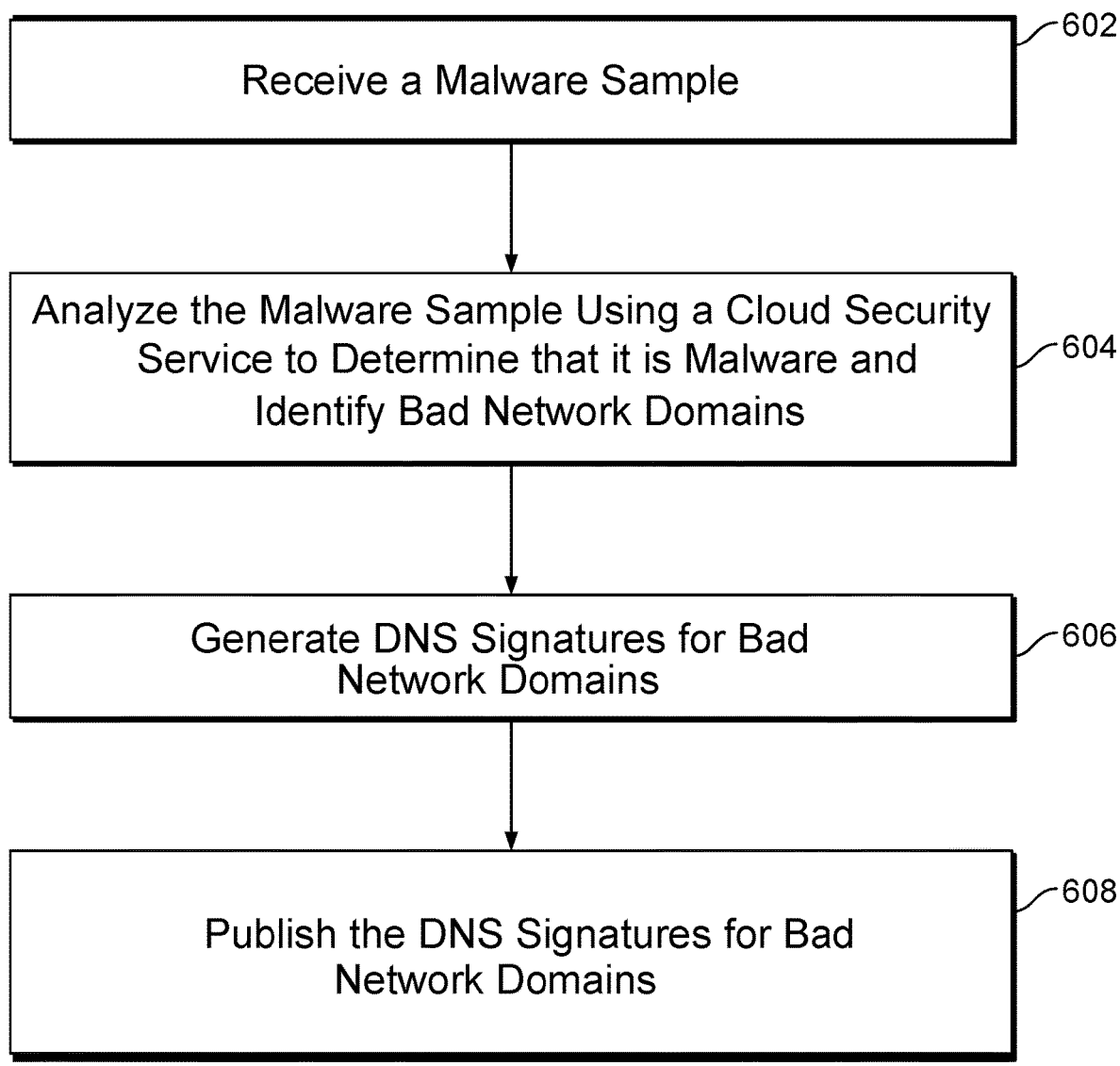
FIG. 6 is another flow diagram illustrating a process for selective sinkholing of malware domains by a security device via DNS poisoning in accordance with some embodiments.

FIG. 6 is another flow diagram illustrating a process for selective sinkholing of malware domains by a security device via DNS poisoning in accordance with some embodiments. At 602, a malware sample is received. For example, a cloud security service can receive malware samples from security devices (e.g., firewalls) of one or more customers. At 604, the malware sample is automatically analyzed using a cloud security service to determine that the malware sample is malware (e.g., to identify the malware as identified malware) and to identify bad network domains. For example, network activity can be monitored during emulation of the malware sample to identify which bad network domains the identified malware attempts to connect to during the emulation, such as described above with respect to various embodiments. At 606, DNS signatures are generated for each of the bad network domains. At 608, the DNS signatures can be published (e.g., automatically distributed) by the cloud security service to firewalls of customers of the cloud security service. For example, a firewall can be configured to sinkhole one or more of these bad network domains to implement various techniques for selective sinkholing of malware domains by a security device via DNS poisoning as described above.

Figure 7:
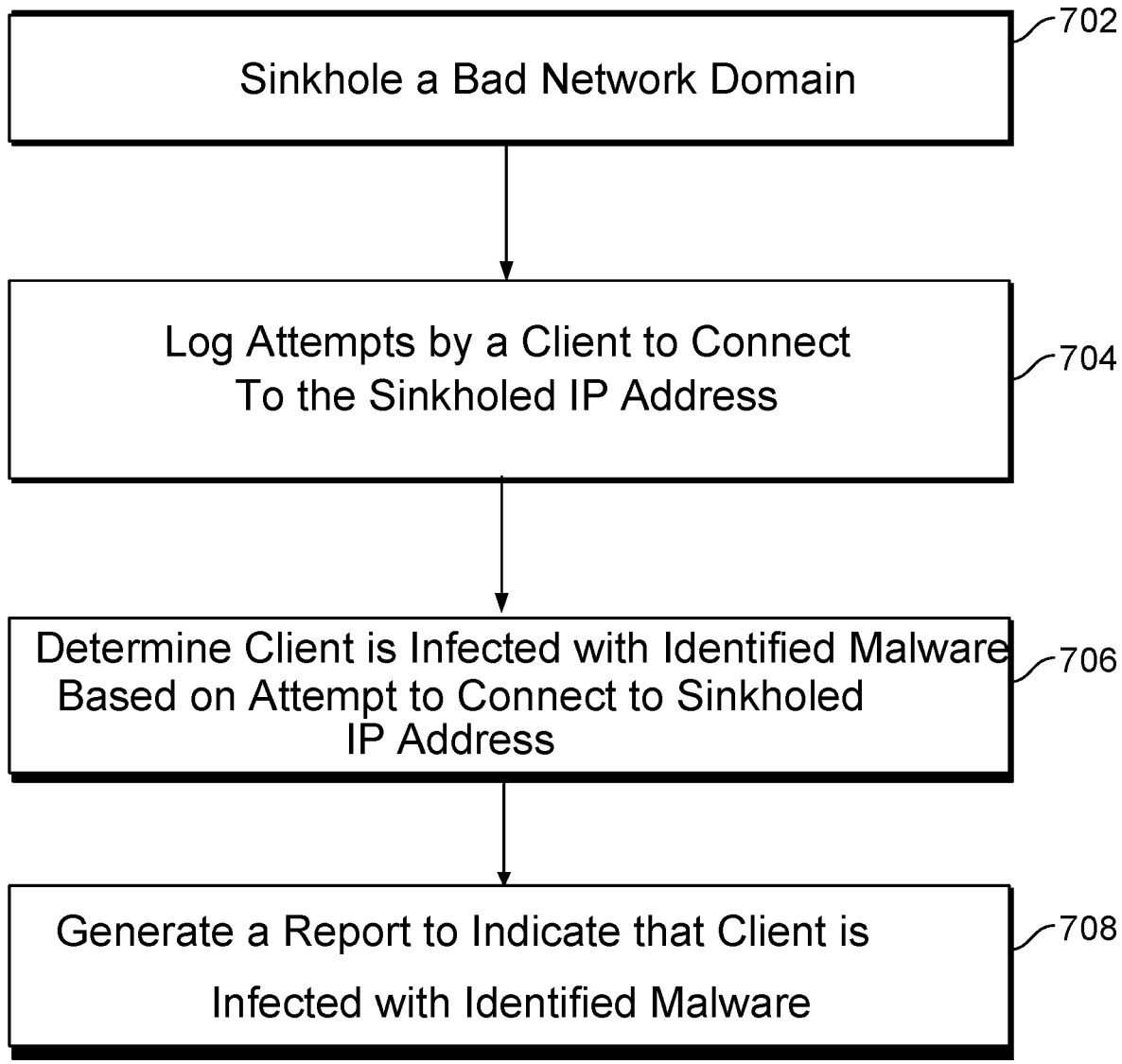
FIG. 7 is another flow diagram illustrating a process for selective sinkholing of malware domains by a security device via DNS poisoning in accordance with some embodiments.

FIG. 7 is another flow diagram illustrating a process for selective sinkholing of malware domains by a security device via DNS poisoning in accordance with some embodiments. At 702, a bad network domain is sinkholed using a designated sinkholed IP address for the bad network domain. For example, a firewall can be configured to sinkhole the bad network domain to implement various techniques for selective sinkholing of malware domains by a security device via DNS poisoning as described above. At 704, attempts by a client (e.g., a client device or another type of host) to connect to the designated sinkholed IP address are logged (e.g., the firewall can be configured to identify any packets with a destination IP address that matches the designated sinkholed IP address for the bad network domain). At 706, that the client is infected with identified malware is determined based on the logged attempt by the client to connect to the designated sinkholed IP address for the bad network domain. At 708, a report is automatically generated to indicate that the client is infected with identified malware based on the logged attempt by the client to connect to the designated sinkholed IP address for the bad network domain.

For example, the following sequence of events can occur if sinkholing is enabled for a bad network domain on the firewall. Malware on an infected host (e.g., a client computer) sends a DNS query to resolve a malicious host on the Internet. The client's DNS query is sent to an internal DNS server (e.g., a local DNS server), which then queries a public DNS server (e.g., a remote DNS server) on the other side of the firewall. The DNS query matches a DNS entry in the DNS signatures data store (e.g., DNS signatures database or other data store), so the sinkhole action will be performed on the query such that a spoofed DNS query response is provided from the firewall to the internal DNS server (e.g., the spoofed DNS query response provides a designated sinkholed IP address for the malicious host). The infected client then attempts to start a session with the malicious host, but uses the designated sinkholed IP address instead as was provided in the spoofed DNS query response and was cached in the internal DNS server. The firewall can also be configured to generate an alert of a malicious DNS query in the threat log, and can be configured to generate a report that identifies infected hosts (e.g., based on a search of traffic logs for the designated sinkholed IP address and to identify any client IP addresses that attempted to start a session with the designated sinkholed IP address).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
 a processor of a first security device is configured to:
  receive one or more DNS signatures from a cloud security service, wherein the first security device is one of a plurality of security devices, wherein each of the plurality of security devices is subscribed to receive updates from the cloud security service to facilitate selective sinkholing of malware domains by the plurality of security devices via DNS poisoning, wherein the cloud security service receives one or more samples from one or more of the plurality of security devices, wherein the cloud security service automatically analyzes at least one sample of the one or more samples by monitoring network activity during emulation of the at least one sample of the one or more samples to identify one or more bad network domains that the at least one sample of the one or more samples attempts to connect to during the emulation, wherein the first security device of the plurality of security devices is configured to sinkhole at least one of the one or more bad network domains to implement selective sinkholing of malware domains by the first security device via DNS poisoning, and wherein the first security device includes a firewall;
  intercept a DNS query for a network domain from a local DNS server at the first security device, wherein the network domain was determined to be a bad network domain based on a match with at least one of the one or more DNS signatures; and generate a DNS query response to the DNS query to send to the local DNS server, wherein the DNS query response includes a time to live (TTL) set to a predetermined period of time, the predetermined period of time being set to a value to allow subsequent queries from local hosts to the local DNS server for the bad network domain to result in a local DNS server cache miss and corresponding to 1, wherein the DNS query response includes a designated sinkholed IP address for the bad network domain to facilitate identification of an infected host, wherein the DNS query response is a spoofed DNS query response, and wherein a cache of the local DNS server is polluted with the designated sinkholed IP address for the bad network domain as a result of the spoofed DNS query response; and a memory coupled to the processor and configured to provide the processor with instructions.

2. The system recited in claim 1, wherein the bad network domain is associated with malware.

3. The system recited in claim 1, wherein the cloud security service receives one or more samples from one or more of the plurality of security devices.

4. The system recited in claim 1, wherein a device of the cloud security service is associated with one or more sinkholed IP addresses for the one or more bad network domains by registering the one or more bad network domains to one or more valid IP addresses controlled by the cloud security service and associated with the device of the cloud security service.

5. The system recited in claim 1, wherein a device of the cloud security service is associated with one or more sinkholed IP addresses for the one or more bad network domains by registering the one or more bad network domains to one or more valid IP addresses controlled by the cloud security service and associated with the device of the cloud security service, and wherein a processor of the device of the cloud security service is configured to:

log each attempted host connection to the one or more sinkholed IP addresses to facilitate identification of infected hosts.

6. The system recited in claim 1, wherein the bad network domain is associated with malware, wherein the malware includes identified malware, wherein a device of the cloud security service is associated with one or more sinkholed IP addresses for the one or more bad network domains by registering the one or more bad network domains to one or more valid IP addresses controlled by the cloud security service and associated with the device of the cloud security service, and wherein a processor of the device of the cloud security service is configured to:

log each attempted host connection to the one or more sinkholed IP addresses to facilitate identification of hosts infected with the identified malware.

7. The system recited in claim 1, wherein the processor of the first security device of the plurality of security devices is configured to:

receive a content update that includes the one or more DNS signatures.

8. The system recited in claim 1, wherein the processor of the first security device of the plurality of security devices is configured to:

receive a content update that includes the one or more DNS signatures; and determine whether a network domain associated with a DNS query matches at least one of the one or more DNS signatures.

9. The system recited in claim 1, wherein the processor of the first security device of the plurality of security devices is configured to:

receive a content update that includes the one or more DNS signatures;

determine whether a network domain associated with a DNS query matches at least one of the one or more DNS signatures; and perform a responsive action in response to the network domain associated with the DNS query matches at least one of the one or more DNS signatures.

10. The system recited in claim 1, wherein the processor of the first security device of the plurality of security devices is configured to:

receive a content update that includes the one or more DNS signatures;

determine whether a network domain associated with a DNS query matches at least one of the one or more DNS signatures; and perform a responsive action in response to the network domain associated with the DNS query matches at least one of the one or more DNS signatures, wherein the responsive action includes one or more of: alert, allow, sinkhole, or block.

11. The system recited in claim 1, wherein a processor of the cloud security service configured to:

receive a sample at the cloud security service;

automatically analyze the sample using the cloud security service to determine whether the sample is associated with malware and to identify one or more bad network domains associated with the malware; and generate one or more DNS signatures for the one or more bad network domains.

12. The system recited in claim 1, wherein the bad network domain is associated with malware, wherein the malware includes identified malware, and wherein the processor of the first security device of the plurality of security devices is configured to:

identify that a particular host is infected with the identified malware based on a request from the particular host to connect to the designated sinkholed IP address.

13. The system recited in claim 1, wherein the processor of the first security device of the plurality of security devices is configured to:

generate a log for each attempted host connection to the designated sinkholed IP address.

14. A method, comprising:

receiving at a first security device one or more DNS signatures from a cloud security service, wherein the first security device is one of a plurality of security devices, wherein each of the plurality of security devices is subscribed to receive updates from the cloud security service to facilitate selective sinkholing of malware domains by the plurality of security devices via DNS poisoning, wherein the cloud security service receives one or more samples from one or more of the plurality of security devices, wherein the cloud security service automatically analyzes at least one sample of the one or more samples by monitoring network activity during emulation of the at least one sample of the one or more samples to identify one or more bad network domains that the at least one sample of the one or more samples attempts to connect to during the emulation, wherein the first security device of the plurality of security devices is configured to sinkhole at least one of the one or more bad network domains to implement selective sinkholing of malware domains by the first security device via DNS poisoning, and wherein the first security device includes a firewall;

intercepting a DNS query for a network domain from a local DNS server at the first security device, wherein the network domain was determined to be a bad network domain based on a match with at least one of the one or more DNS signatures; and generating a DNS query response to the DNS query to send to the local DNS server, wherein the DNS query response includes a time to live (TTL) set to a predetermined period of time, the predetermined period of time being set to a value to allow subsequent queries from local hosts to the local DNS server for the bad network domain to result in a local DNS server cache miss and corresponding to 1, wherein the DNS query response includes a designated sinkholed IP address for the bad network domain to facilitate identification of an infected host, wherein the DNS query response is a spoofed DNS query response, and wherein a cache of the local DNS server is polluted with the designated sinkholed IP address for the bad network domain as a result of the spoofed DNS query response.

15. A computer program product, the computer program product being embodied in a tangible non-transitory computer readable storage medium and comprising computer instructions which when executed by a processor cause the processor to perform operations comprising:

receiving at a first security device one or more DNS signatures from a cloud security service, wherein the first security device is one of a plurality of security devices, wherein each of the plurality of security devices is subscribed to receive updates from the cloud security service to facilitate selective sinkholing of malware domains by the plurality of security devices via DNS poisoning, wherein the cloud security service receives one or more samples from one or more of the plurality of security devices, wherein the cloud security service automatically analyzes at least one sample of the one or more samples by monitoring network activity during emulation of the at least one sample of the one or more samples to identify one or more bad network domains that the at least one sample of the one or more samples attempts to connect to during the emulation, wherein the first security device of the plurality of security devices is configured to sinkhole at least one of the one or more bad network domains to implement selective sinkholing of malware domains by the first security device via DNS poisoning, and wherein the first security device includes a firewall;

intercepting a DNS query for a network domain from a local DNS server at the first security device, wherein the network domain was determined to be a bad network domain based on a match with at least one of the one or more DNS signatures; and generating a DNS query response to the DNS query to send to the local DNS server, wherein the DNS query response includes a time to live (TTL) set to a predetermined period of time, the predetermined period of time being set to a value to allow subsequent queries from local hosts to the local DNS server for the bad network domain to result in a local DNS server cache miss and corresponding to 1, wherein the DNS query response includes a designated sinkholed IP address for the bad network domain to facilitate identification of an infected host, wherein the DNS query response is a spoofed DNS query response, and wherein a cache of the local DNS server is polluted with the designated sinkholed IP address for the bad network domain as a result of the spoofed DNS query response.

* * * * *